(12) United States Patent
Li (10) Patent No.: US 7,739,404 B2
(45) Date of Patent: Jun. 15, 2010

(54) SCALABLE METHODS FOR DISTRIBUTING ROUTING INFORMATION TO BORDER GATEWAY PROTOCOL (BGP) DEVICES

(75) Inventor: Hongzhou Li, West Roxbury, MA (US)

(73) Assignee: Avaya Inc., Basking Ridge, NJ (US)

( * ) Notice: Subject to any disclaimer, the term of this patent is extended or adjusted under 35 U.S.C. 154(b) by 610 days.

(21) Appl. No.: 11/616,380

(22) Filed: Dec. 27, 2006

(65) Prior Publication Data

US 2007/0258376 A1 Nov. 8, 2007

Related U.S. Application Data

(60) Provisional application No. 60/797,185, filed on May 3, 2006.

(51) Int. Cl.
*G06F 15/173* (2006.01)
(52) U.S. Cl. .................. 709/242; 370/238; 370/351; 709/238
(58) Field of Classification Search .............. 370/229, 370/235, 238, 351, 389, 400, 401; 709/238, 709/242
See application file for complete search history.

(56) References Cited

U.S. PATENT DOCUMENTS

| | | | | |
|---|---|---|---|---|
| 5,666,559 A | * | 9/1997 | Wisor et al. ............... | 710/32 |
| 6,970,464 B2 | * | 11/2005 | Xu et al. ................... | 370/392 |
| 7,359,393 B1 | * | 4/2008 | Nalawade et al. .......... | 370/401 |
| 7,430,176 B2 | * | 9/2008 | Nalawade et al. .......... | 370/238 |
| 2006/0182038 A1 | | 8/2006 | Nalawade et al. | |
| 2006/0233181 A1 | | 10/2006 | Raszuk et al. | |

OTHER PUBLICATIONS

Rekhter, Y. et al.; "A Border Gateway Protocol 4 (BGP-4)"; RFC 1771; 57 pages; Mar. 1995.

* cited by examiner

*Primary Examiner*—William Trost, IV
*Assistant Examiner*—Siming Liu
(74) *Attorney, Agent, or Firm*—Chapin IP Law, LLC; David W. Rouille, Esq.

(57) ABSTRACT

Described are a Border Gateway Protocol (BGP) network device and method for distributing routing information to a plurality of BGP peers over a network. The BGP network device dynamically calculates a number of groups and a number of BGP peers in each group based on routing information to be distributed. A time interval is specified within which to generate an update message for each BGP peer in a select one of the groups. An update message is generated for each BGP peer in the select group during the time interval. Routes included in the update message for each BGP peer are based on an outbound routing policy for that BGP peer. The update messages are forwarded for transmission to the BGP peers in the select group after the time interval expires.

20 Claims, 5 Drawing Sheets

SCALABLE METHODS FOR DISTRIBUTING ROUTING INFORMATION TO BORDER GATEWAY PROTOCOL (BGP) DEVICES

RELATED APPLICATION

This utility application claims the benefit of U.S. Provisional Patent Application No. 60/797,185, filed on May 3, 2006, the entirety of which provisional application is incorporated by reference herein.

FIELD OF THE INVENTION

The invention relates generally to networks and maintaining current routing information at network elements or network devices within a network. More particularly, the invention relates to methods of distributing routing information among border gateway protocol (BGP) network devices within a BGP network.

BACKGROUND

The Border Gateway Protocol, or BGP, is an inter-domain routing protocol used to exchange routing information among network devices (i.e., routers) in the same or in different autonomous systems (AS). An AS is one or more networks under control of a common administration entity and having common routing policies. A BGP network device is a computing system that runs the Border Gateway Protocol. Neighbor BGP network devices, also referred to as BGP peers, establish a transport protocol connection with each other, exchange messages to open a BGP session, and then exchange their entire routing information (i.e., routing table). In general, this routing information includes the complete route to each network destination reachable from a BGP network device. Each route comprises a destination address and information that describes the path to the address destination.

Typically, an address prefix represents the destination address in a given route. This address prefix includes a network address combined with a mask that indicates how many bits of the network address serve to identify the network. The remaining bits of the address prefix are available to represent network devices within that network. The path to the address destination (described within a given route) includes an Origin attribute, an AS_Path attribute, and a Next_Hop attribute. The Origin attribute indicates the means by which a BGP network device learned of the route. The AS_Path attribute provides a list of autonomous systems for reaching the address destination. The autonomous systems appear in the AS_Path in the order of their traversal. The Next_Hop attribute provides the address of the next hop (i.e., network device) towards the address destination.

Throughout an established BGP session, BGP peers maintain their routing information by exchanging incremental updates, such as the advertisement of new routes or withdrawals of existing routes. In general, BGP peers use update messages to exchange changes to the routing information. A BGP update message includes a message header, an Unfeasible Routes Length field, a Withdrawn Routes field, a Total Path Attribute Length field, a Path Attributes field, and a Network Layer Reachability Information (NLRI) field. The Unfeasible Routes Length field indicates the length of the Withdrawn Routes field. The Withdrawn Routes field indicates the address prefixes of routes being withdrawn from service. The Total Path Attribute Length field indicates the length of the Path Attributes field. The Path Attributes field provides the attributes, e.g., the Next_Hop attribute, Origin Attribute, and the AS_Path attribute, of each route being advertised in the BGP update message. The NLRI field provides the address field of each feasible route being advertised in the BGP update message.

Each BGP network device maintains the routes within a routing table. When a BGP network device advertises a reachable route or determines that a particular address destination is now unreachable, it sends update messages to its peers so that the peers may update their own routing tables. The time expended for a BGP network device to distribute the contents of its routing table (or updates of its routing table) to its BGP peers is referred to as convergence time. When the BGP network device has a large number of peers (e.g., more than 200) and a large number of routes (e.g., 100,000 or more) in its routing table, convergence can be a relatively slow process (in the order of several minutes). During a slow convergence, the end user can undergo degraded quality of experience because of latency, loss of packets, unreachable destinations, and packets received out of order.

In recognition of this problem, industry has devised different types of mechanisms to reduce convergence time. One type of mechanism, illustrated in FIG. 1, uses peer-groups 14-1, 14-2, 14-n (generally, 14). Currently, there are two forms of peer-groups: static peer-groups and dynamic update peer-groups.

Figure 1:
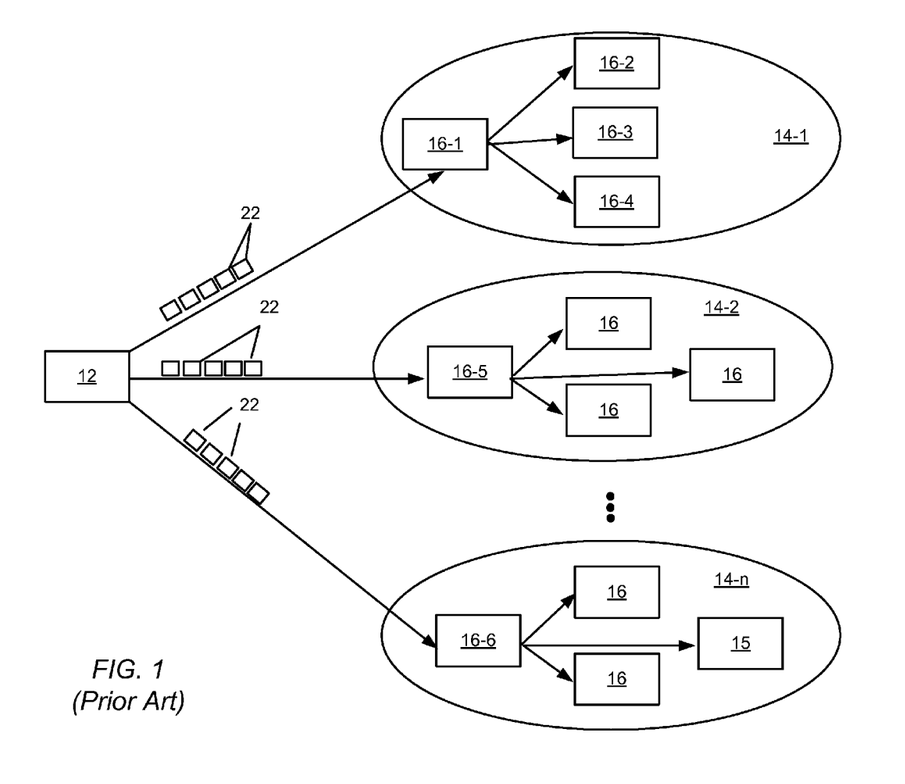
FIG. 1 is a block diagram representation of a prior art border gateway protocol (BGP) network.

For static peer-groups, each peer-group 14 includes one or more BGP peers 16, up to a defined maximum number. To be in the same peer-group, each member BGP peer 16 must have the same outbound routing policies. For instance, the BGP peers 16-1, 16-2, 16-3, and 16-4 of the peer-group 14-1 have the same outbound routing policies. In general, a routing policy determines how a given BGP network device 16 processes inbound and outbound routes. In many instances, a routing policy operates to filter routes, accept routes, accept and modify routes, and reject routes. Setting a routing policy for a BGP network device generally involves configuration by a network operator (e.g., through a CLI (command line interface)). Known mechanisms for configuring a routing policy for a BGP device include, but are not limited to, one or more of the following mechanisms: access lists, filter lists, prefix lists, prefix trees, and route maps.

Referring to FIG. 1, each static peer-group 14 having more than one BGP peer includes a master device. For example, BGP device 16-1 is the master device of peer-group 14-1, BGP device 16-5 is the master device of peer-group 14-2, and BGP device 16-6 is the master device of peer-group 14-3.

Consider another BGP network device 12, which learns of a new route or withdrawal of an existing route and is in communication with each group master. By sending update messages to group masters only, the BGP network device 12 produces fewer update messages than if it sent such messages to all of its BGP peers 16, thus accelerating convergence. The BGP network device 12 walks through its BGP routing table for each group master only, filters the address prefixes through the outbound policies of the group masters, generates update messages 22, and sends the update messages 22 to the group masters. Each group master replicates its received update messages 22 and sends them to the other peer devices 16 in their respective static peer-group 14.

The requirement that all peers in the same peer-group must have the same outbound routing policy is, however, a limitation that can lead a network operator to configure small BGP peer-groups, which reduces the efficiency of update message generation. Another limitation is that every BGP device 16 in the same peer-group 14 must belong to the same address family.

In recognition of the limitations of static peer-group configurations, industry produced dynamic update-peer groups. Dynamic update peer-groups separate BGP update message generation from peer-group configuration. For instance, BGP peers sharing the same outbound routing policy that are not members of a peer-group can become members of an update peer-group. This mechanism dynamically calculates BGP update group membership based on outbound routing policies, automatically and independently, and, unlike static peer-groups, requires no configuration by the network operator. In addition, outbound routing policies no longer restrict BGP neighbor configuration, and update peer-groups can belong to different address families. A limitation, however, is that the BGP network device must recalculate update-group membership upon every implementation of or change to an outbound routing policy.

SUMMARY

In one aspect, the invention features a method of distributing routing information by a border gateway protocol (BGP) network device to a plurality of BGP peers over a network. At least one group is formed into which to place the BGP peer. Each BGP peer is placed into one of the groups. A BGP update message is generated for each BGP peer individually in a first one of the groups during a time interval of specified duration. Each update message contains a number of routes based on the duration of that time interval. The routes included in the update message for each BGP peer is determined for that BGP peer based on an outbound routing policy for that BGP peer.

In another aspect, the invention features a method of accelerating convergence for updating routing tables at a plurality of border gateway protocol (BGP) peers A BGP network device dynamically calculates a number of groups and a number of peers in each group based on routing information at the BGP device. A time interval is specified within which to generate an update message for each BGP peer in a select one of the groups. An update message is generated for each BGP peer in the select one of the groups during the time interval. The update messages are forwarded for transmission to the BGP peers in the select group after the time interval expires.

In another aspect, the invention features a border gateway protocol (BGP) network device in communication with a plurality of BGP peers over a network. The BGP network device comprises memory storing a routing table and program code with computer-readable instructions for distributing changes to the routing table to the BGP peers. A processor executes the program code to determine a number of groups into which to place the BGP peers and to place each BGP peer into one of the groups. The processor generates a BGP update message individually for each BGP peer in a first one of the groups during a time interval of specified duration. Each update message contains a number of routes based on the duration of that time interval. The routes included in the update message for each BGP peer being determined for that BGP peer based on an outbound routing policy for that BGP peer.

BRIEF DESCRIPTION OF THE DRAWINGS

The above and further advantages of this invention may be better understood by referring to the following description in conjunction with the accompanying drawings, in which like numerals indicate the same structural elements and features in various figures. The drawings are not necessarily to scale, emphasis instead being placed upon illustrating the principles of the invention.

DETAILED DESCRIPTION

In brief overview, a BGP network device embodying the invention distributes its routing information to its BGP peers over a network by placing each BGP peer into one of a plurality of groups. The BGP network device dynamically calculates the number of groups based on the number of BGP peers and on the type and amount of routing information to be distributed, such as the number of NLRI prefixes and types of route changes (i.e., withdrawals, advertisements). In the placement of BGP peers into groups, the BGP network device can place any given BGP peer into any one of the groups (i.e., there are no restrictions on group membership, such as needing to share the same outbound routing policy).

The BGP network device generates update messages for each group in succession, that is, the BGP network device completes generating update messages for BGP peers of a first group before generating update messages for BGP peers of a second group, and so on. When generating update messages for a select group of BGP peers, the BGP network device produces an update message for each BGP peer in the group during a time interval of specified duration, placing as many routes within each update message as possible during that time interval. The routes included in the update message for each BGP peer in the group is determined individually for that BGP peer based on the particular outbound routing policy for that BGP peer. After the time interval expires, the update messages are forwarded for transmission to the BGP peers and the processor (e.g., CPU) of the BGP network device becomes available for performing other tasks before resuming generation of new update messages during the next time interval (to be sent to members of the same group or next group of BGP peers). Yielding the processor at specified intervals to other processes ensures that the processor does not "hang" when involved in generating and distributing update messages and in performing other BGP-related tasks.

In general, the number of BGP peers placed in each peer-group can be relatively small (e.g., 16, 32, 64, or 128). In addition, the duration of the time interval, although sufficiently brief so as not to monopolize use of the processor, is sufficiently long to allow a relatively large number of routes (e.g., several hundred) to be processed. Accordingly, each generated update message can carry relatively large number of routes. More routes per update message leads to fewer update messages being sent to each BGP peer, thus producing less network traffic, resulting in fewer unknown destinations, and causing fewer packets to be lost or received out of order.

Other advantages include being able to place BGP peers into peer-groups without intervention of a network operator and without needing to replicate update messages (as is done for static peer-groups) or needing to dynamically recalculate update-group memberships whenever an outbound routing policy of a BGP peer changes (as is done for dynamic update-peer groups). In addition, finding commonality among BGP peers, such as the same address family or a common outbound routing policy, is not a requirement for a BGP peer to be a member of a group. In addition, it can be easy and efficient to do Poison Reverse and to do BGP Stateful, which records to which peers that the route sends. Performance is thus independent of the number of BGP peers that share a common outbound routing policy. Accordingly, the principles of the invention can scale with the number of BGP peers. Further, the present invention may be practiced in conjunction with static peer-group configurations, with dynamic update peer-group implementations, or with a combination thereof.

Figure 2:
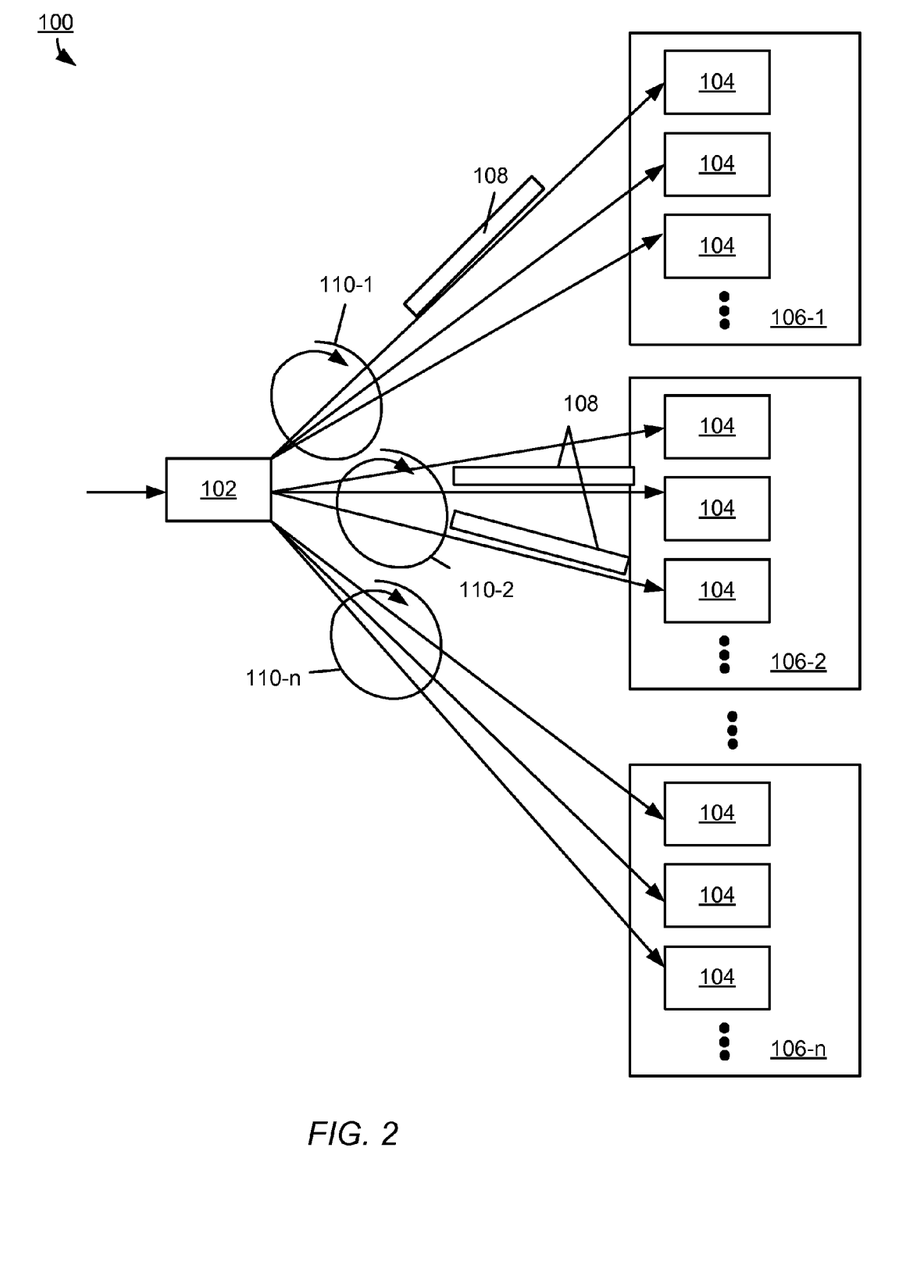
FIG. 2 is a block diagram representation of one embodiment of a BGP network in which a BGP network device distributes its routing table updates to groups of BGP peers in accordance with the invention.

FIG. 2 shows an embodiment of a BGP network 100 including a first BGP network device 102 in communication with a plurality of BGP peers 104. In one embodiment, each BGP device 102, 104 is a member of a different autonomous system (AS), that is, they are external peers—eBGP peers. In other embodiments, all of the BGP devices 102, 104 are in the same AS—iBGP peers. In this exemplary illustration, the BGP device 102 has a routing table that is to be distributed to each of its BGP peers 104.

Each BGP peer 104 belongs to one of a plurality of groups 106-1, 106-2, 106-n (generally, 106). The BGP device 102 can determine group membership automatically, without network operator intervention, and dynamically, when update messages are to be distributed to the BGP peers 104. First, the BGP network device 102 determines the number of groups based on the number of BGP peers 104 and the number of peers in each group 106 based on the number of advertisement and withdrawal prefixes in the routing table. Consider, for example, 224 BGP peers 104, if the number of withdrawal routes is larger than the number of advertisement routes, the number of peers in each group is set to 64. Otherwise, the number of peers is set to 32. Then the BGP network device 102 divides the BGP peers 104, equally or unequally, among the groups 106.

In general, there are no restrictive criteria for placing a particular BGP peer 104 into a particular group. No particular characteristic of a given BGP peer 104 (e.g., its outbound routing policy) determines in which group that BGP device is placed. In addition, the BGP peers 104 in a particular group need not have, although they may have, the same outbound routing policies. Further, there is no requirement that the BGP peers 104 belong to the same address family (i.e., the BGP peers 104 within a single group 106 may belong to the same address family, but need not be). Placement of a given BGP peer 104 within a group 106 can be arbitrarily determined. For example, factors for group placement can depend on where the BGP peer 104 appears in a table or linked list, whether the groups 106 are populated in round-robin fashion or sequentially, upon a number assigned to the autonomous system to which the BGP peer 104 belongs, or upon an address of the BGP peer 104.

Figure 3:
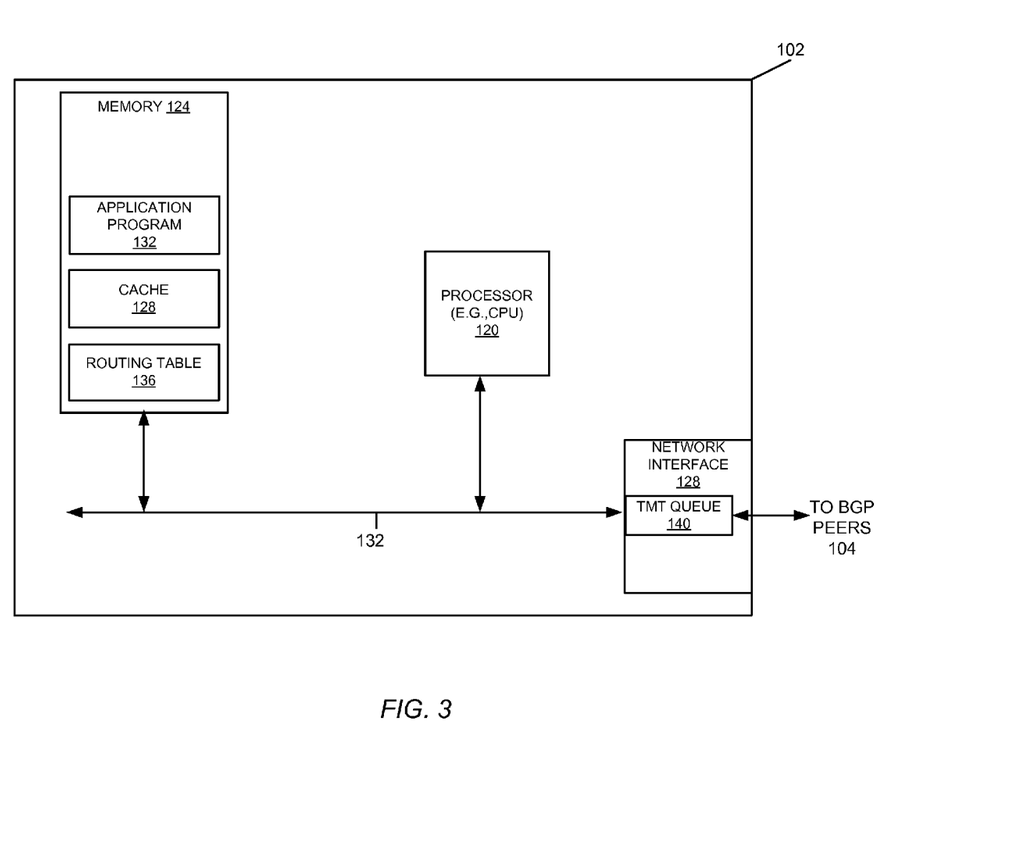
FIG. 3 shows an embodiment of a BGP network device embodying the invention.

FIG. 3 shows an oversimplified embodiment of the BGP network device 102 constructed in accordance with the invention. In general, the BGP network device 102 is a processor-based computing system that functions as a network element or router and has a BGP module for running the border gateway protocol and generating update messages as described herein. The BGP network device 102 includes a processor 120 in communication with memory 124 and with a network interface 128 over a signal bus 132. The memory 124 includes cache 128, program code 132 for generating and forwarding update messages as described herein, and a routing table 136. The network interface 128 includes a transmit queue 140 for holding update messages to be transmitted over the network 100 to the BGP peers 104. As described in more detail below, the BGP network device 102 generates and sends update messages 108 to each group 106 of BGP peers 104 in succession. To transmit the entire update (e.g., the full routing table or updates to the routing table), the BGP network device 102 loops 110-1 through the first group 106-1, before progressing and looping 110-2 through the BGP peers 106 of the second group 106-2, and eventually progressing and looping through the BGP peers 106 of the last group 106-n.

Figure 4A:
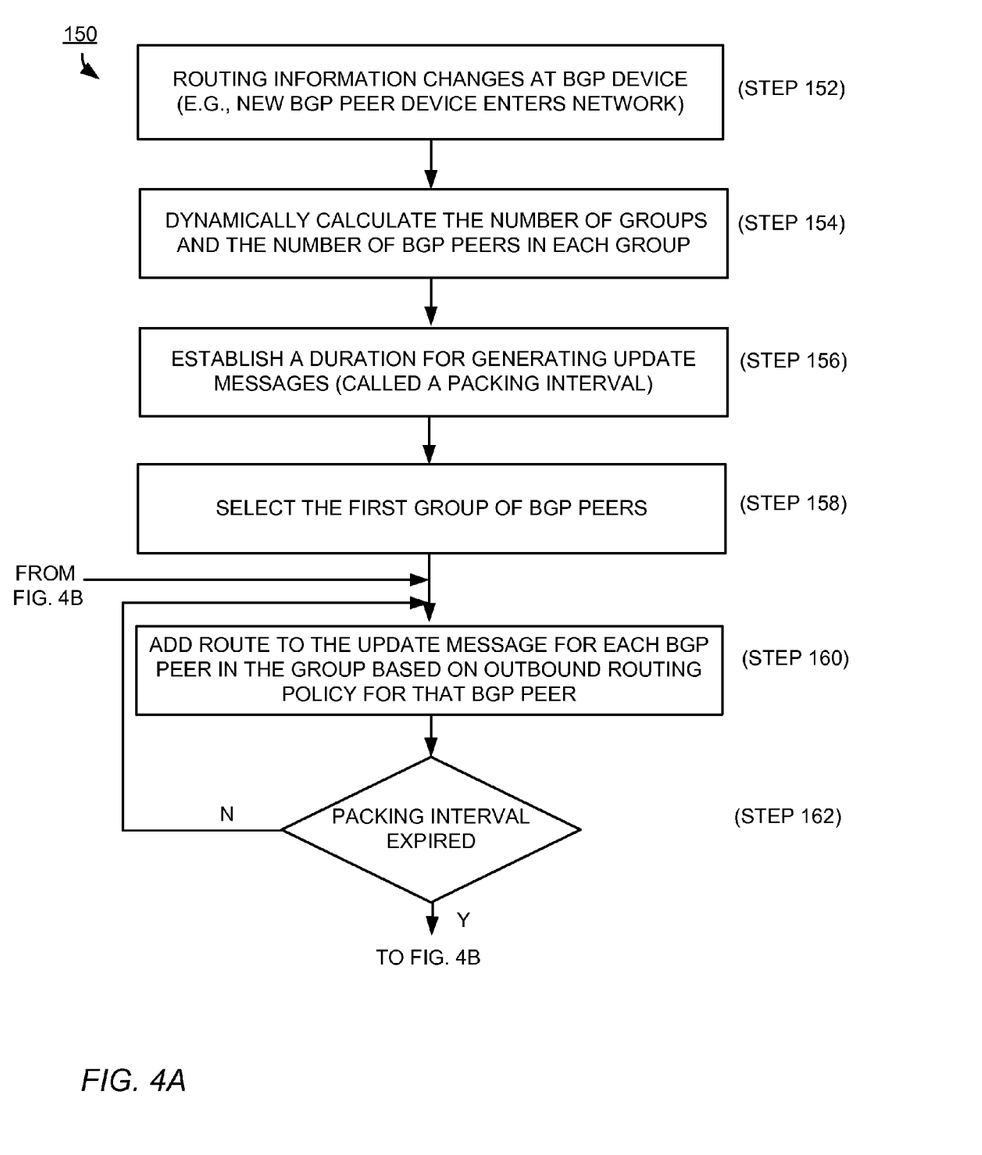
FIG. 4A and FIG. 4B are a flow diagram of an embodiment of a process for generating and distributing BGP messages in accordance with the invention.
Figure 4B:
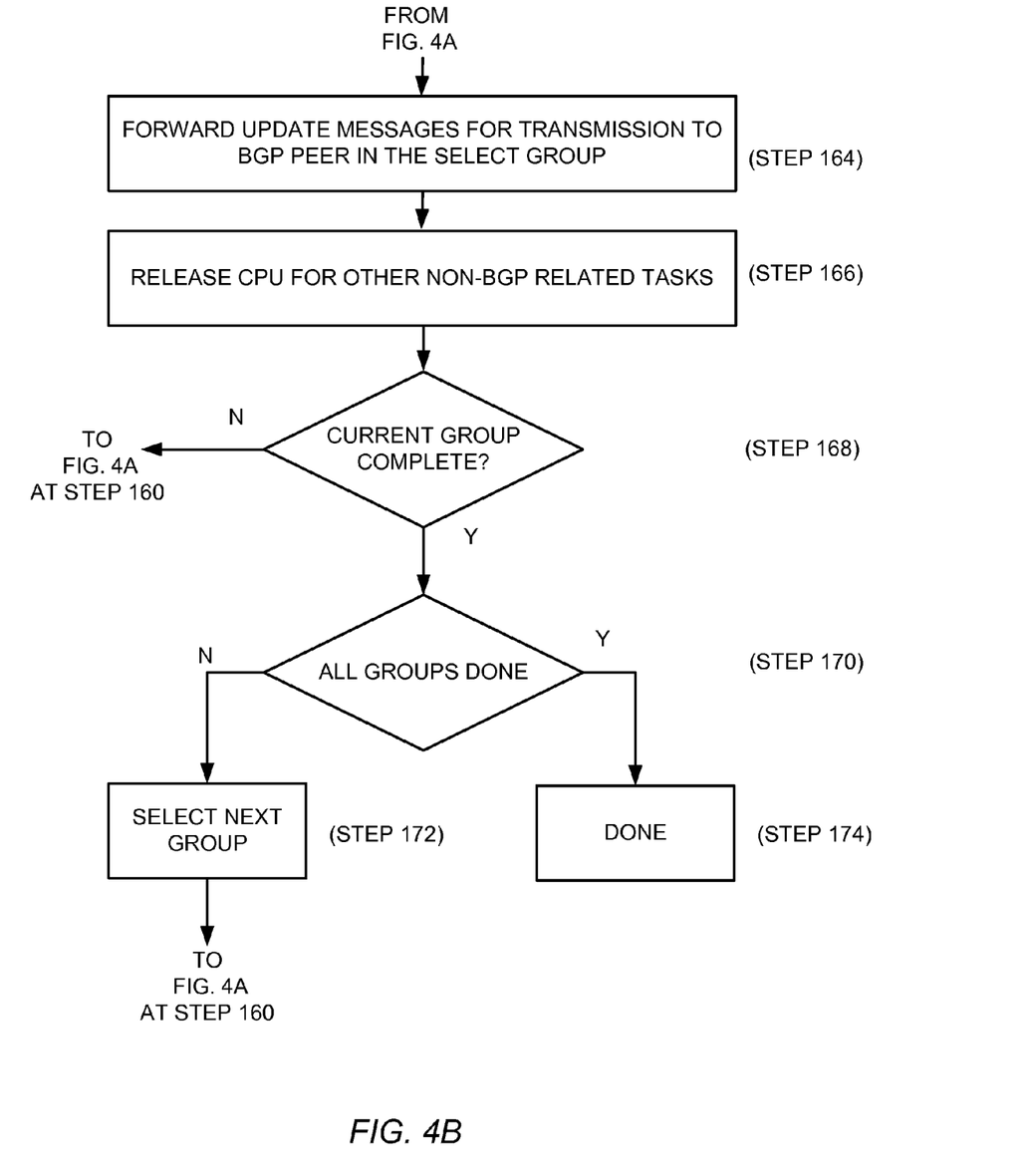

FIG. 4A and FIG. 4B show an embodiment of a process 150 performed by the BGP network device 102 for distributing routing information to its BGP peers 104 in accordance with the invention. In the description of the process 150, reference is also made to FIG. 2 and FIG. 3. At step 152, the routing information stored in the routing table 136 of the BGP device 102 changes. The change may be a result of, for example, a new BGP peer joining the network 100, the appearance of a new route, or the disappearance of a previously existing route. The BGP network device 102 determines to notify its BGP peers 104 of the changes to its routing table 136.

The BGP device 102 dynamically calculates (step 154) the number of peer groups and the number of BGP peers within each peer group. One objective is to have few BGP peers (e.g., less than or equal to 128) in each group, so that more routes may be packed into each update message. The determination of the number of groups (and the size) is based on such factors as the number of routes being withdrawn from the routing table, the number of routes being advertised. For example, the BGP network device 102 can process withdrawals faster than it can process advertisements. So as to avoid overrunning the transmit queue 140, the BGP network device 102 can place more BGP peers 104 into each group when the number of withdrawals exceeds the number of advertisements.

At step 156, the BGP network device 102 specifies a time interval (or time slot). The time interval represents the duration during which the processing power of the processor 120 is dedicated to the packing of routes into BGP update messages. The duration of this time interval may be statically predetermined or dynamically determined based on similar factors used to determine the number of groups.

In general, the duration of the time interval is selected to avoid monopolization of the processor's resources. Because of the large number of routes and number of BGP peers, the generation of update messages can be a resource-intensive operation that could monopolize use of the processor 120, preventing the BGP network device 102 from processing other tasks. In one embodiment, the time interval is approximately 50 ms in duration. Time intervals of other durations e.g., from approximately 30 ms to approximately 100 ms, can be used without departing from the principles of the invention.

At step 158, the BGP network device 102 selects a first group of BGP peers 104. During a single packing interval, the BGP network device 102 generates an update message for each BGP peer 104 in the selected group 106. At step 160, the BGP network device 102 adds a route to the update message for each BGP peer 104. The BGP peers 104 within the group 106 may or may not have the same outbound routing policy; the BGP network device 102 adds a route to the update message for a given BGP peer 104 in accordance with the particular outbound routing policy of that BGP peer 104. The BGP network device 102 continues to add routes to the update messages of each BGP peer 104 until the time interval expires (at step 162).

When the time interval expires, the BGP network device 102 forwards (step 164) the update messages to the transmit queue 140 for transmission to the BGP peers 104 of the select group 106 and relinquishes (step 166) use of the processor 120 for other tasks, if any, to be performed by the BGP network device 102. If, at step 168, the BGP network device 102 has not yet completely processed every route in its routing table (or every update to its routing table) for the current set of BGP peers 104 in the select group 106, the generation of update messages resumes at step 160. During the next time interval, the BGP network device 102 prepares another set of update messages for transmission to the current set of BGP peers 104, as described above.

When the BGP network device 102 finishes with the select group 106 of BGP peers 104, the BGP network device 102 determines (step 170) whether it has completed generating update messages for every group 106. If not, the BGP network device 102 (step 172) selects the next group of peers and continues generating update messages for the peers in this next group (at step 160). When all groups are complete, convergence has occurred and the process 150 terminates (step 174).

For purposes of illustrating the process 150 with an example and its advantages by comparison, consider a system in which the BGP network device 102 has 224 peers, with each peer having 1000 routes. Accordingly, the routing table of the BGP network device includes 224,000 routes. To distribute its routing table to its BGP peers 104, the BGP network device 102 needs to send 223,000 to each of the 224 peers (224,000 minus the 1000 routes currently known by that BGP peer).

If, for purposes of comparison, the BGP network device 102 did not use peer-groups, the BGP network device 102 is able to include approximately 40 routes in each of the 224 update messages (one to each of the 224 BGP peers) within a 50 ms interval. (Other BGP network devices may include more or fewer routes than the example provided, depending upon the processing power and memory capabilities of the particular BGP network device). Convergence occurs in approximately 280 seconds.

In contrast, consider that in accordance with the principles of the invention, the same BGP network device 102 divides the BGP peers 104 into groups, for example, 7 groups with 32 BGP peers 104 in each group. Consider further that the BGP device 102 uses the same 50 ms interval, and that during this interval the BGP device 102 is able to pack 700 routes in each update message to each of the 32 peers in the group. (Improvements in packing performance may be attributable to locality of reference, i.e., smaller numbers of BGP peers in each peer-group increases the likelihood that the data structures, such as the update message under construction, the outbound policy for a given BGP peer, are presently in the data cache 128, thus reducing processing time. Conversely, larger numbers of BGP peers in each group can lead to more cache misses, and negatively impact packing performance). Under these conditions, convergence occurs within approximately 112 seconds (223,000 routes/14000 routes per second*7 groups). Accordingly, the larger update messages (i.e., 700 routes vs. 40 routes) provide an observed increase in convergence by over 50%. In addition to improving convergence time, the system produces fewer messages than that without peer groups, consumes less network bandwidth, and reduces the likelihood of network congestion, unknown destinations, lost packets, or packets received out of order.

Program code (or software) of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented in hardware (digital or analog), software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of distributing routing information from a Border Gateway Protocol (BGP) network device to a plurality of BGP peers over a network, the method comprising:
   forming at least one group into which to place the BGP peers;
   placing each BGP peer into one group of the at least one group; and
   generating a BGP update message for each BGP peer individually in a select group of the at least one group during a time interval of specified duration, each update message containing a number of routes based on the duration of that time interval, the routes included in the update message for each BGP peer being determined for that BGP peer based on an outbound routing policy for that BGP peer.

2. The method of claim 1, further comprising the step of automatically and dynamically determining a number of groups.

3. The method of claim 2, wherein the number of groups is based on a number of withdrawn routes and a number of advertisement routes to be distributed.

4. The method of claim 3, wherein the number of groups is smaller when the number of withdrawn routes exceeds the number of advertisement routes than for when the number of advertisement routes exceeds the number of withdrawn routes.

5. The method of claim 1, wherein the time interval has a duration of approximately 50 ms.

6. The method of claim 1, further comprising the step of releasing a central processing unit of the BGP device for use in processing other tasks after the time interval expires if other tasks need CPU.

7. The method of claim 1, wherein each BGP peer may be placed into any group of the at least one group irrespective of the outbound routing policy of each BGP peer.

8. The method of claim 1, wherein two or more of the BGP peers in the select group can have different outbound routing policies.

9. A method of accelerating convergence for updating routing tables at a plurality of border gateway protocol (BGP) peers, the method comprising:
   dynamically calculating, by a BGP network device, a number of groups and a number of peers in each group based on routing information to be distributed;

specifying a time interval within which to generate an update message for each BGP peer in a select one of the groups;

generating an update message for each BGP peer in the select group during the time interval, each update message containing a number of routes based on the duration of the time interval; and forwarding the update messages for transmission to the BGP peers in the select group after the time interval expires.

10. The method of claim 9 wherein the step of generating includes the step of adding one or more routes to the update message for each peer in the select group based on an outbound routing policy of that peer.

11. The method of claim 9 further comprising the step of releasing processor resources, after the time interval expires, so that such resources can be used to process tasks other than for generating the update messages.

12. The method of claim 9 further comprising the step of repeating the steps of generating and forwarding update messages for each peer in the select group during subsequent time intervals until the BGP device has completely processed the routing information to be distributed to each BGP peer in the select group.

13. The method of claim 9, further comprising the steps of:

selecting a next group of peers;

generating an update message for each peer in the selected next group during a subsequent time interval; and forwarding the update messages generated for each peer in the selected next group to the peers in the selected next group when the subsequent time interval expires.

14. A border gateway protocol (BGP) network device in communication with a plurality of BGP peers over a network, the BGP network device comprising:

memory storing a routing table and program code with computer-readable instructions for distributing changes to the routing table to the BGP peers; and a processor executing the program code to determine a number of groups into which to place the BGP peers and to place each BGP peer into one group in the number of groups, the processor generating a BGP update message individually for each BGP peer in a select group in the number of groups during a time interval of specified duration, each update message containing a number of routes based on the duration of that time interval, the routes included in the update message for each BGP peer being determined for that BGP peer based on an outbound routing policy for that BGP peer.

15. The BGP network device of claim 14, wherein the number of groups is based on a number of withdrawn routes and a number of advertisement routes to be distributed.

16. The BGP network device of claim 15, wherein the number of groups is smaller when the number of withdrawn routes exceeds the number of advertisement routes than for when the number of advertisement routes exceeds the number of withdrawn routes.

17. The BGP network device of claim 14, wherein the time interval has a duration of approximately 50 ms.

18. The BGP network device of claim 14, wherein after the time interval expires the processor becomes available to process other tasks than generating update messages.

19. The BGP network device of claim 14, wherein each BGP peer may be placed into any group in the number of groups irrespective of the outbound routing policy of each BGP peer.

20. The BGP network device of claim 14, wherein two or more of the BGP peers in the select group can have different outbound routing policies.

* * * * *